United States Patent
Karan et al.

(10) Patent No.: US 11,623,780 B2
(45) Date of Patent: Apr. 11, 2023

(54) SYSTEM FOR BUILDING LABELS USING AN UPDATEABLE GRAPHIC

(71) Applicant: Kenco Label & Tag Co., LLC, Milwaukee, WI (US)

(72) Inventors: Aharon A. Karan, Glendale, WI (US); Andrew Aidan Gaines, Glendale, WI (US)

(73) Assignee: Kenco Label & Tag Co., LLC, Milwaukee, WI (US)

( * ) Notice: Subject to any disclaimer, the term of this patent is extended or adjusted under 35 U.S.C. 154(b) by 64 days.

(21) Appl. No.: 16/738,704

(22) Filed: Jan. 9, 2020

(65) Prior Publication Data

US 2020/0231320 A1 Jul. 23, 2020

Related U.S. Application Data

(60) Provisional application No. 62/794,127, filed on Jan. 18, 2019.

(51) Int. Cl.
| | |
|---|---|
| *B65C 9/40* | (2006.01) |
| *B65C 9/18* | (2006.01) |
| *B41J 15/04* | (2006.01) |
| *B65C 9/46* | (2006.01) |

(52) U.S. Cl.
CPC ............ *B65C 9/40* (2013.01); *B41J 15/044* (2013.01); *B65C 9/18* (2013.01); *B65C 9/46* (2013.01); *B65C 2009/408* (2013.01)

(58) Field of Classification Search
CPC .... B65C 9/18; B65C 9/40; B65C 9/46; B65C 2009/408; B41J 15/044; G06Q 30/0643
See application file for complete search history.

(56) References Cited

U.S. PATENT DOCUMENTS

| | | | |
|---|---|---|---|
| 10,839,332 B1* | 11/2020 | McBride | G06Q 30/0621 |
| 2001/0011279 A1* | 8/2001 | Hajjar | G06Q 30/06 |
| 2005/0071296 A1* | 3/2005 | Lepkofker | G07B 17/00508 705/410 |
| 2010/0257210 A1* | 10/2010 | Witkin | G06Q 30/00 705/26.1 |
| 2014/0104656 A1* | 4/2014 | Crisp | G09F 3/10 358/1.18 |
| 2018/0247356 A1 | 8/2018 | Thompson | |

FOREIGN PATENT DOCUMENTS

WO    2016135659    9/2016

\* cited by examiner

*Primary Examiner* — George R Koch
(74) *Attorney, Agent, or Firm* — Boyle Fredrickson, S.C.

(57) ABSTRACT

In a system for building labels, such as adhesive-backed labels or tags produced on rolls or sheets for printing, an image or graphic of an arrangement of labels is displayed to a user and continuously updated in real time as parameters relating to construction of the labels are provided by the user in order to provide real time feedback. In one aspect, a user can be guided by the system to make various selections and/or inputs, such as selecting between rolls or sheets, types of material, size/measurements, shape(s), color(s), and the like, in progressing stages of a customized label build, with a displayed graphic of a corresponding arrangement of labels being continuously updated instantly at each stage to visually reflect the user's input. Upon completion, the system can communicate with an industrial machine to build the labels for the user consistent with the input as depicted by the graphic.

12 Claims, 10 Drawing Sheets

SYSTEM FOR BUILDING LABELS USING AN UPDATEABLE GRAPHIC

CROSS-REFERENCE TO RELATED APPLICATION(S)

This application claims priority to U.S. Provisional Patent Application No. 62/794,127, entitled "System for Building Labels Using an Updateable Graphic," filed on Jan. 18, 2019, which is herein incorporated by reference.

FIELD OF THE INVENTION

This invention relates generally to labels, such as adhesive-backed labels or tags produced on rolls or sheets, and more particularly, to a system for building such labels.

BACKGROUND OF THE INVENTION

Adhesive-backed labels are widely used for shipping, inventory control and other purposes. Such labels are typically provided on individual sheets or wound rolls having a suitable backing or substrate web that are fed through printers. Such labels are essentially a commodity item and are ideally produced using high-speed, large-volume production methods and machinery so that they can be sold at low cost to consumers.

Many different types of printers for printing on different types of labels exist today. However, such printers typically have different size and/or printing requirements. For example, while one printer might require labels that are at least 0.5"×0.5" on 8.5"×11" sheets, another printer might require labels that are at least 0.125"×0.125" on rolls having a core diameter of at least 1". It is therefore important for consumers to obtain labels that are suitable for use with the printers they have. In addition, most printers typically allow printing of labels in many different configurations, such as multiple labels in a row, or labels of different colors, thereby giving consumers some flexibility in their choice of label, notwithstanding the selection of printer.

Although preconfigured labels compatible with given printers are generally available, preconfiguring such labels limits the choices available to consumers and can increase supply costs by requiring greater inventory. Also, while consumers can provide information for custom builds of labels, such information is usually provided without the benefit of real time feedback concerning the build, thereby increasing the possibility of an incorrect build. It is therefore desirable to provide a system which allows consumers to build custom labels suitable for their printers while minimizing the possibility of incorrect builds.

SUMMARY OF THE INVENTION

In a system for building labels, such as adhesive-backed labels or tags produced on rolls or sheets for printing, an image or graphic of an arrangement of labels is displayed to a user and continuously updated in real time as parameters relating to construction of the labels are provided by the user in order to provide real time feedback. In one aspect, a user can be guided by the system to make various selections and/or inputs, such as selecting between rolls or sheets, types of material, size/measurements, shape(s), color(s), and the like, in progressing stages of a customized label build, with a displayed graphic of a corresponding arrangement of labels being continuously updated instantly at each stage to visually reflect the user's input. Upon completion, the system can communicate with an industrial machine to build the labels for the user consistent with the input as depicted by the graphic.

Specifically, then, one aspect of the invention can include a system for building labels, the system including a processor executing a program stored in a non-transient medium to: receive a first parameter defining a characteristic of an arrangement of labels; produce a graphic illustrating the arrangement of labels consistent with the first parameter; receive a second parameter defining a further characteristic of the arrangement of labels; and update the graphic to illustrate the arrangement of labels consistent with the first and second parameters.

Another aspect of the invention can include a method for building labels, including: receiving a first parameter defining a characteristic of an arrangement of labels; producing a graphic illustrating the arrangement of labels consistent with the first parameter; receiving a second parameter defining a further characteristic of the arrangement of labels; and updating the graphic to illustrate the arrangement of labels consistent with the first and second parameters.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE INVENTION

Figure 1:
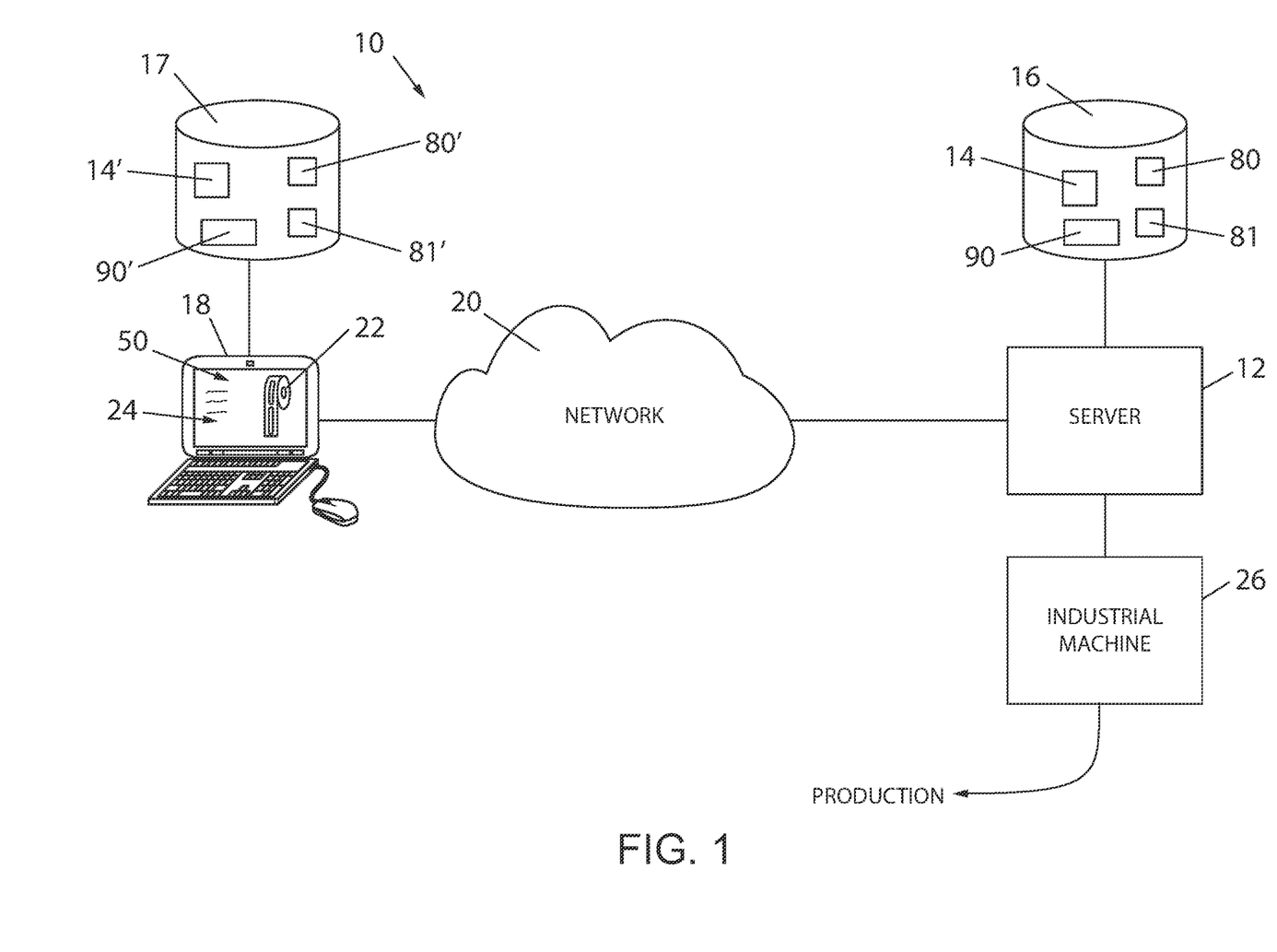
FIG. 1 is a diagram of system for building labels, such as adhesive-backed labels or tags for printing, in which an updateable graphic illustrating an arrangement of labels consistent with input from a user is provided in accordance with an aspect of the invention.

Referring now to the drawings and specifically to FIG. 1, a system 10 for building labels, such as adhesive-backed labels or tags for printing, typically useable for shipping, inventory control and other purposes, is provided in accordance with an aspect of the invention. The system can include a server 12 having a processor executing a program 14 stored in a non-transient medium or data storage 16 to enable building the labels. A user can access the server 12 and the program 14 for building labels through a computer 18 connected through a network 20. The computer 18 could comprise a personal computer, laptop, smartphone, tablet or any other computing device having a system for input and a computer display, such as a monitor or screen. The network 20 could comprise one or more Local Area Networks (LAN), Wide Area Networks (WAN), such as the Internet, and/or network access equipment, such as switches, routers, access points, and the like, enabling secure communication between the computer 18 and the server 12.

For building labels, in one aspect, a user can access the server 12 and the program 14 via the computer 18 to build and display an image or graphic 22 of a virtual arrangement of labels through the screen of the computer 18. As the user makes various selections and/or inputs on the computer 18 as parameters 24 received by the program 14 relating to the build, the program 14 can execute to continuously update the graphic 22 to the screen of the computer 18 to visually reflect the parameters provided by the user. In another aspect, for providing real time feedback, a user can access the server 12 and the program 14 via the computer 18 to download a local, client-side implementation of the program 14, labeled as program 14' stored in a data storage 17 connected to the computer 18, to build and display the graphic 22. Accordingly, the graphic 22 is an updateable graphic of the arrangement of labels provided to the user's screen, providing visual feedback, and in some aspects instant visual feedback, to the user of the label build.

Upon executing the program 14 (or program 14'), a user can be guided by the system to make various selections and/or inputs through the computer 18, such as selecting between rolls or sheets, types of material, size/measurements, shape(s), color(s), and the like, in progressing stages of a custom build, with the displayed graphic 22 of a corresponding arrangement of labels being continuously updated at each stage of the build to visually reflect the user's input. Upon completion, the server 12 can communicate to the industrial machine 26 parameters to physically build the arrangement of labels specified by the user, consistent with the user's selections and/or inputs provided as the parameters 24, suitable for use by a given printer for printing thereon, and as depicted by the graphic 22.

Figure 2:
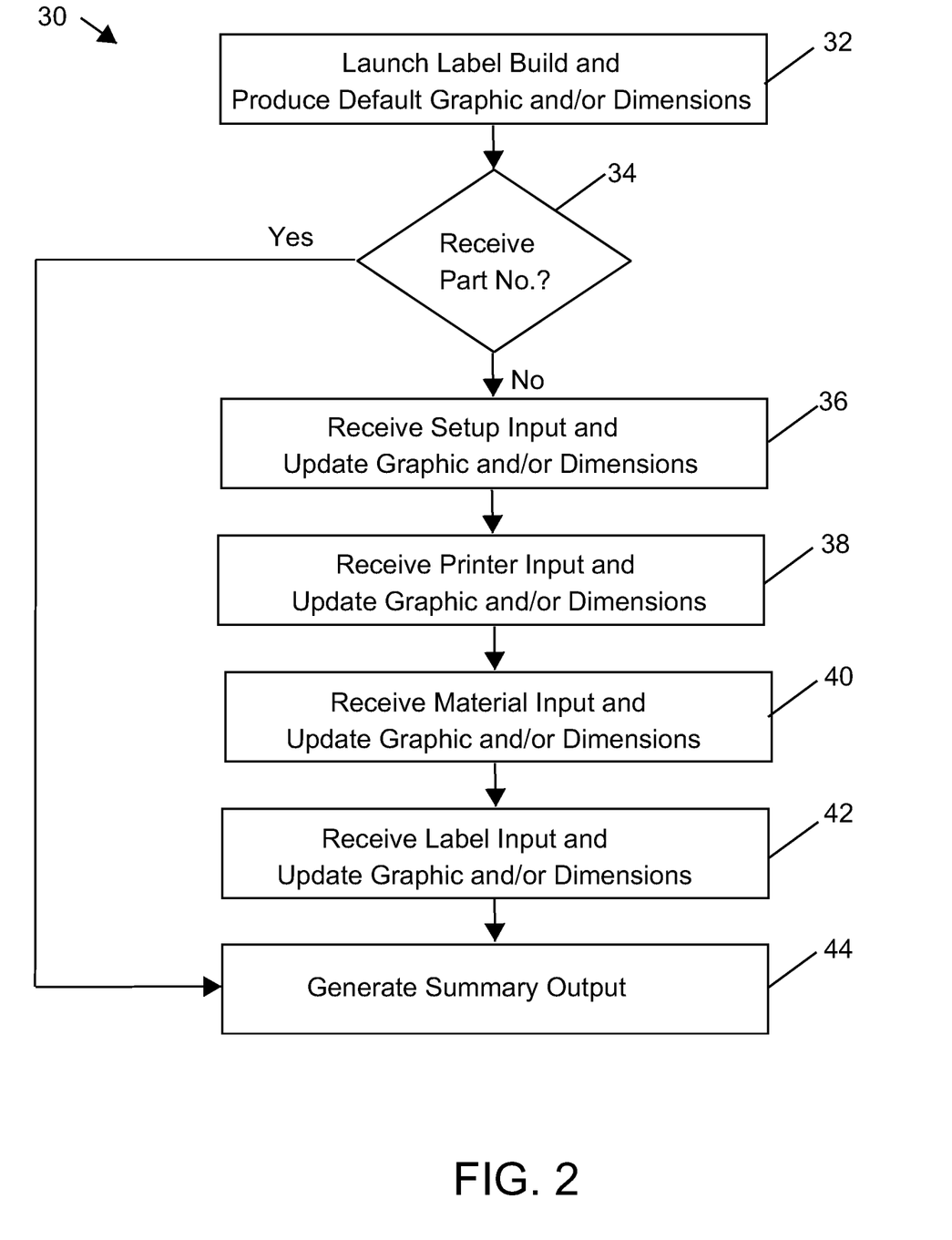
FIG. 2 is an exemplary process for building labels in the system of FIG. 1.

Referring now to FIG. 2, a process 30 for building the labels in the system 10 is provided in accordance with an aspect of the invention. Beginning at step 32, the user can begin the label build process by initially launching the program 14 through the computer 18. This could be accomplished, for example, by the user selecting a corresponding web address through an Internet browser for connecting to the server 12, and the user selecting a corresponding build icon at the web address for launching the program 14. In another aspect, this could be accomplished by launching the program locally. Upon launching the program, an initial, default of the graphic 22, comprising a virtual arrangement of labels on a suitable backing or substrate web, complete with dimensions, shape and color, can be produced and displayed to the screen of the computer 18. The graphic 22 can be quickly produced as software code executing by the program 14, such as JavaScript (JS), jQuery (a well-known JS library) and/or Cascading Style Sheets (CSS) prepared in a markup language such as Hypertext Markup Language (HTML), without requiring reference to an alternative website or program.

Figure 3:
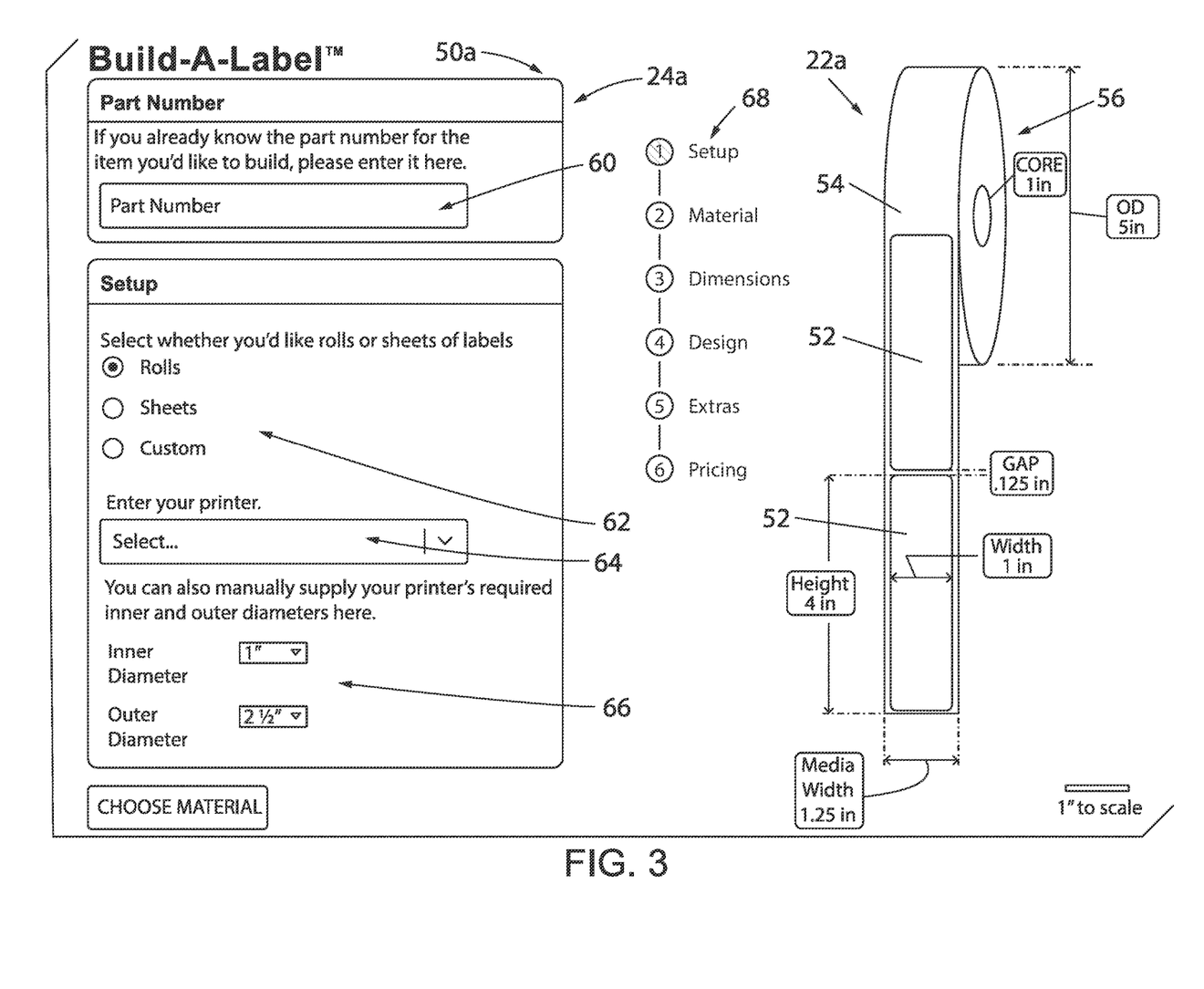
FIG. 3 is an exemplar display, including fields for receiving parameters and an updateable graphic, in accordance with an aspect of the invention.

With additional reference to FIG. 3, an exemplar display 50a, including the graphic 22 being an updateable graphic in an initial variation, labeled 22a, and fields for initially receiving the parameters 24, labeled 24a, could be initially displayed to the screen of the computer 18 in accordance with an aspect of invention. The default of the graphic 22 could comprise, for example, an arrangement of labels 52 on a backing 54 comprising a wound roll 56, along with exemplary corresponding dimensions, displayed with suitability for use by a given printer. Dimensions could include, for example, a core diameter ("Core") for the wound roll, such as for fitting on a printer spool, and outer diameter ("OD") for the wound roll, a "gap" between labels 52 on the backing 54, a "height" and "width" of labels 52, and/or a "media width" of the backing 54/wound roll 56, measured in inches. In one aspect, the graphic 22 can advantageously be displayed to the screen approximately to scale with correct ratios of dimensions, including heights, widths, diameters, gaps and the like, as they relate to one another when manufactured for use by a printer, whether displayed to the screen of the computer 18 in actual size, expanded/zoomed or reduced.

The fields for receiving the parameters 24 could comprise, for example, a part number input 60, a label selection 62, a printer selection 64, and/or a label input 66. The part number input 60 could allow the user to directly enter a predetermined part number containing fields for immediately building an arrangement of labels and producing an update to the graphic 22 reflecting the build corresponding to the part number. The label selection 62 could allow the user to select a type of label, such as "rolls," "sheets" or "custom." The printer selection 64 could allow the user to select a given printer having a predetermined configuration for building labels. The label input 66 could allow the user to manually input a measurement with respect to the arrangement of labels, such as an "inner diameter" (corresponding to the core diameter dimension for the wound roll) and/or or an "outer diameter (corresponding to the outer diameter dimension for the wound roll).

In addition, progressing stages 68 of the custom build, for guiding the user to make various selections and/or inputs, can be displayed during the label build. Such stages 68 could include, for example: "Setup," "Material," "Dimensions," "Design," "Extras" and/or "Pricing," listed in numerical order, and highlighted upon corresponding progression by the user to the given stage.

Figure 10:
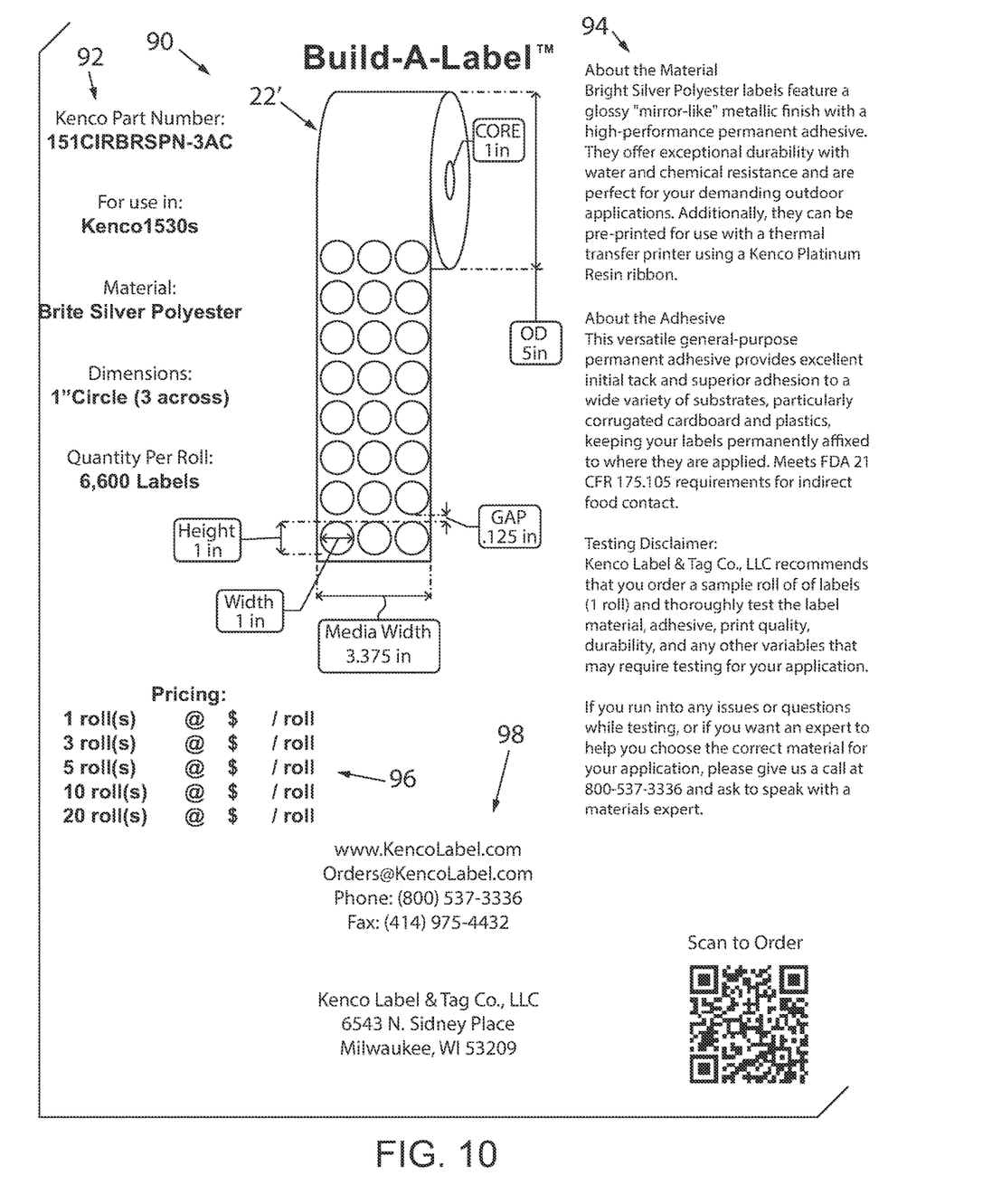
FIG. 10 is an exemplar display in which a summary output of built labels with a part number is provided in accordance with an aspect of the invention.

Referring again to FIG. 2, following step 32, the process 30 can proceed to determine whether the user has provided a part number, such as through the part number input 60. If the user does provide a part number ("Yes,") the process can proceed directly to step 44, in which a summary output is generated, along with immediate update to the graphic 22 visually reflecting the arrangement of labels corresponding to the part number, including as discussed further below with respect to FIG. 10. However, if the user does not provide a part number ("No,") the process can continue through steps 36-42 to build the arrangement of labels in successive stages, ultimately progressing toward step 44. It should be appreciated that the aforementioned steps 36-42 could be completed in various orders within the scope of the invention.

Figure 4:
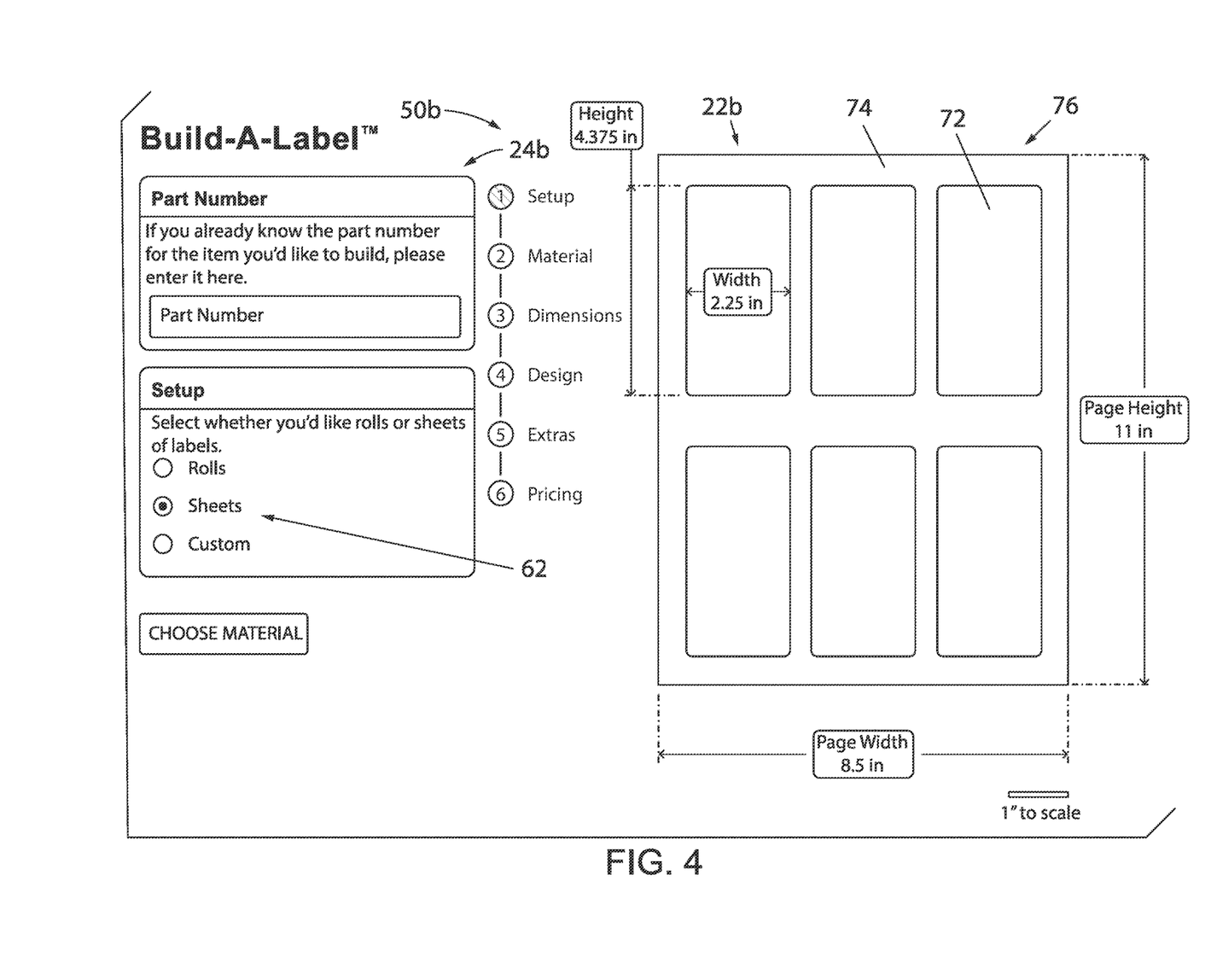
FIG. 4 is an exemplar display in which the graphic has been updated according to a selection of "sheets" as a type of label in accordance with an aspect of the invention.

At step 36, the user can provide setup input, such as via the label selection 62. Upon receiving the setup input and processing the corresponding parameter, the graphic 22 can immediately update to the screen to visually reflect the arrangement of labels consistent with such setup input. For example, with additional reference to FIG. 4, the user can provide setup input comprising a selection of "sheets" (instead of "rolls") via the label selection 62. Such a selection could result in an exemplar display 50b including the graphic 22b being updated to the screen of the computer 18 to display the revised arrangement of labels on a backing 74 of a sheet 76, along with updated corresponding dimensions. Updated dimensions could include, for example, a "page height" for the sheet 76, a "page width" for the sheet 76, a gap between labels 72 on the backing 74 and/or a height and "width" of labels 72, measured in inches.

Figure 5:
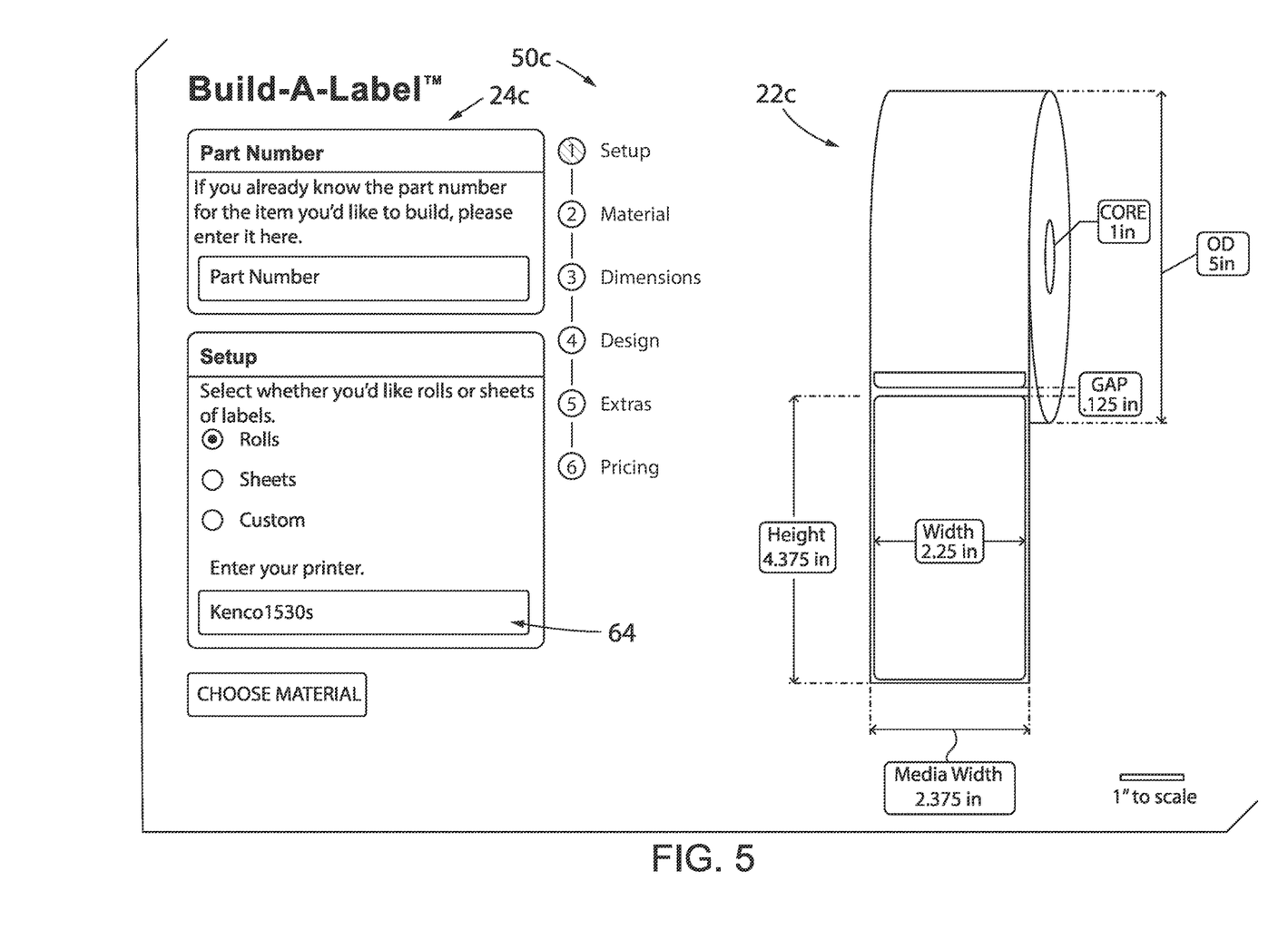
FIG. 5 is an exemplar display in which the graphic has been updated according to a selection of "rolls" and selection of a type of printer in accordance with an aspect of the invention.

At step 38, the user can select a given printer having a predetermined configuration for building labels, such as via the printer selection 64. Upon receiving the printer selection and processing the corresponding parameter, the graphic 22 can immediately update to the screen to visually reflect the arrangement of labels consistent with such setup input as defined by a selected printer. For example, with additional reference to FIG. 5, the user can select the "Kenco1530s" printer via the printer selection 64. The program 14, in turn, can reference a printer database 80 (or printer database 80' retrieved from the data storage 16 and stored in the data storage 17) (see FIG. 1) to load a predetermined configuration for building labels corresponding to the selected printer. Such a selection could result in an exemplar display 50c, including the graphic 22 being updated to the screen of the computer 18 to display the revised arrangement of labels as a graphic 22c, illustrating the arrangement as required by the selected printer. This could comprise, for example, a change in appearance of the graphic from sheets (FIG. 4) to rolls (FIG. 5), a change in dimensions of the graphic as dimensions that are required by the selected printer, and the like.

Figure 6:
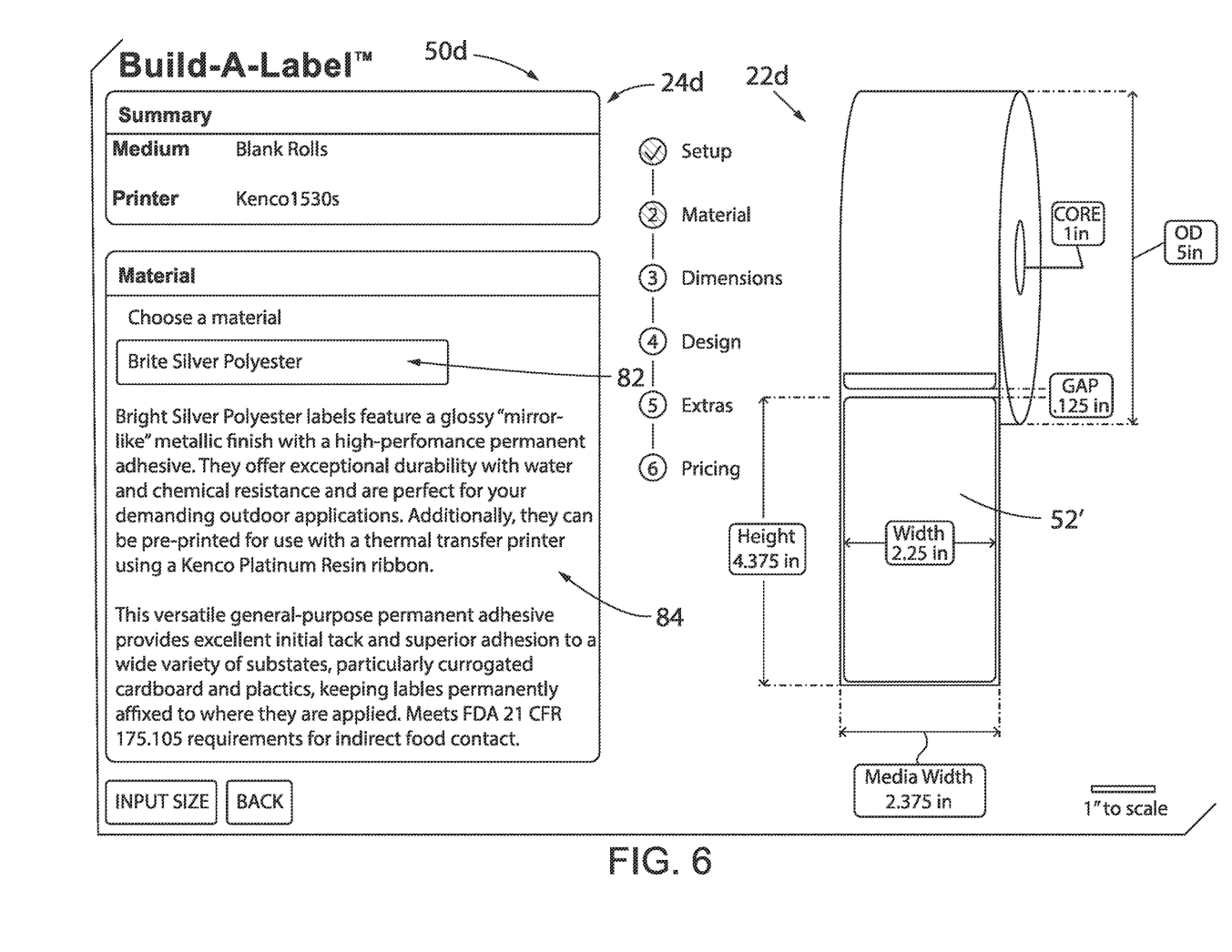
FIG. 6 is an exemplar display in which the graphic has been updated according to a selection of a type of material for the labels in accordance with an aspect of the invention.

At step 40, the user can select a type of material for the labels. For example, with additional reference to FIG. 6, the user can select "Brite Silver Polyester" as a type of material for the labels, such as via a material selection 82. Upon receiving the material selection and processing the corresponding parameter, the graphic 22 can immediately update to the screen to visually reflect the arrangement of labels consistent with such material. For example, the program 14, in turn, can reference a material database 81 (or material database 81' retrieved from the data storage 16 and stored in the data storage 17) (see FIG. 1) to update the graphic 22, and perhaps provide background information 84 about the selected material. Such a selection could result in an exemplar display 50d, including the graphic 22 being updated to the screen of the computer 18 to display the revised arrangement of labels as a graphic 22d, illustrating the labels in a different color, shading, texture or contour corresponding to the given material selection, such as the labels having a silver finish corresponding to "Brite Silver Polyester."

Figure 7:
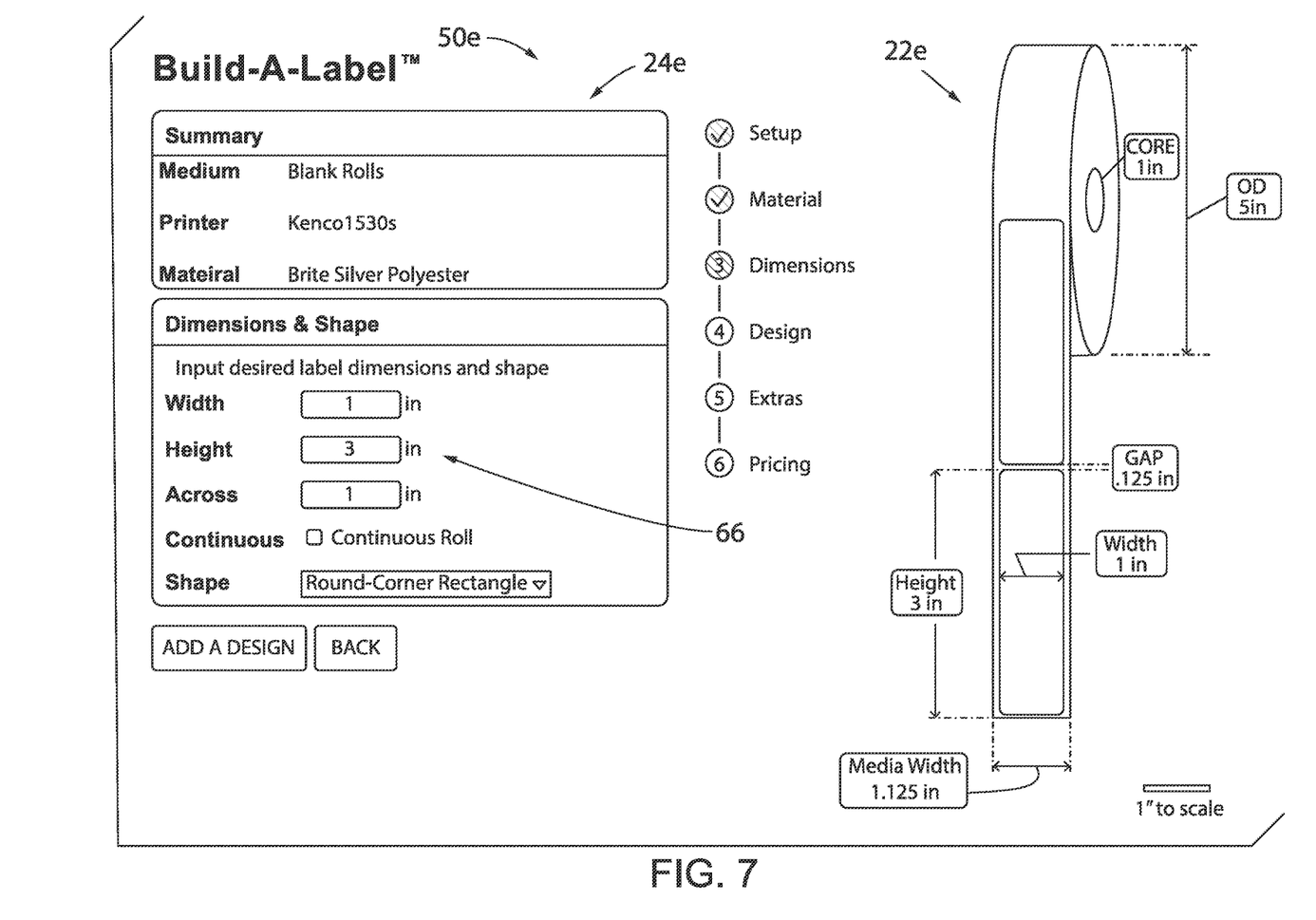
FIG. 7 is an exemplar display in which the graphic has been updated according to an input of a measurement with respect to the labels in accordance with an aspect of the invention.
Figure 8:
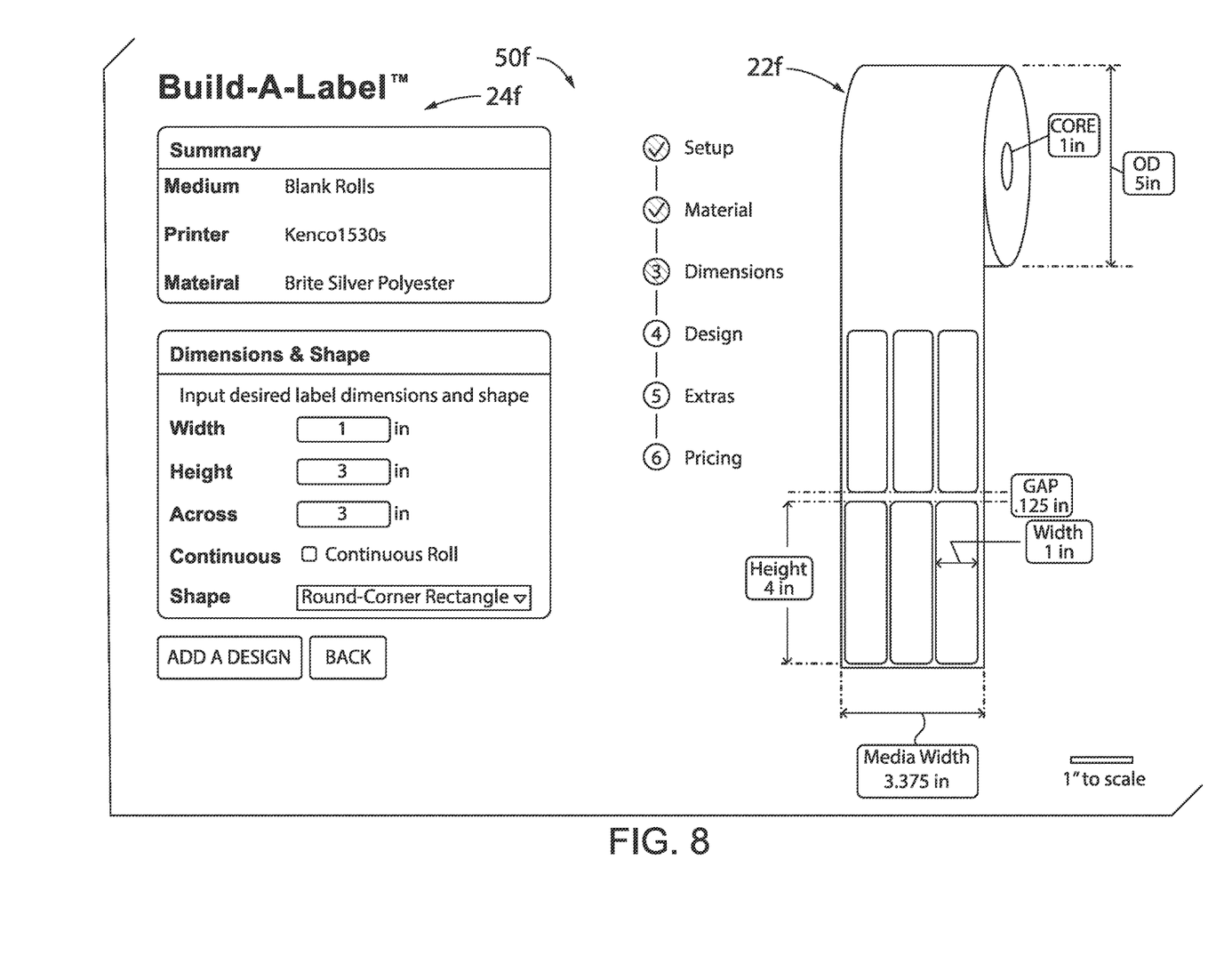
FIG. 8 is an exemplar display in which the graphic has been updated according to an input of a number of labels "across" in accordance with an aspect of the invention.
Figure 9:
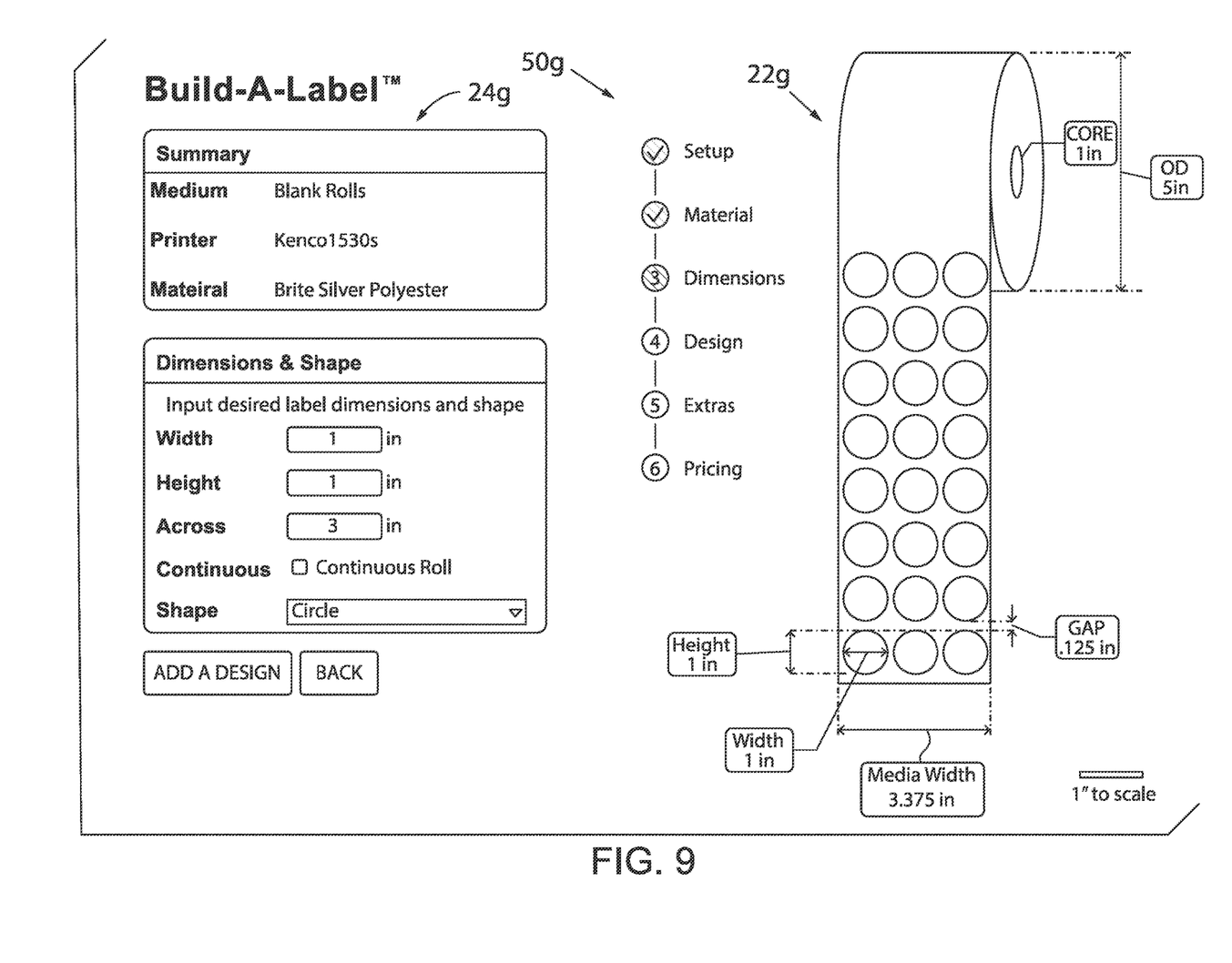
FIG. 9 is an exemplar display in which the graphic has been updated according to a selection of shape with respect to the labels in accordance with an aspect of the invention.

At step 42, the user can select more specific label input. Upon receiving the specific label input and processing corresponding parameters, the graphic 22 can immediately update to the screen to visually reflect the arrangement of labels consistent with such input. For example, with additional reference to FIG. 7, the user can select given measurements for the label via the label input 66. Such input could result in an exemplar display 50e including the graphic 22e being updated to the screen of the computer 18 to display the revised arrangement of labels as specified, along with updated corresponding dimensions. This could comprise, for example, changing the labels to a narrower shape, such as specifying a dimension of 1"×3". With additional reference to FIG. 8, the user can also select another specific label input of specifying an alternative label distribution on the backing, such as three labels across, as depicted in the exemplar display 50f. With additional reference to FIG. 9, the user can also select another specific label input specifying an alternative label shape, such as circles, as depicted in the in the exemplar display 50g. Other specific label input could comprise whether the labels are a "continuous roll," whether the labels are rectangles with square or rounded corners, whether a custom shape is required, and so forth. Accordingly, in one aspect, with each selection, the graphic 22 can be updated in real-time with the selection to display to the screen the graphic approximately to scale with correct ratios of dimensions, including heights, widths, diameters, gaps and the like, as they relate to one another when manufactured for use by a printer.

Accordingly, each of the aforementioned inputs and/or selections can be processed as parameters to dynamically update the graphic 22 in real time, consistent with the parameters, to visually reflect the arrangement of labels on the screen as directed by the user's input. Referring again to FIG. 2, and with additional reference to FIG. 10, at step 44, a summary output 90 can then be immediately generated for the user at the end of the label build. The summary output 90 could be, for example, a hardcopy or softcopy Portable Document Format (PDF) or similar page made available to the user, such as by downloading, printing, emailing or the like, as summary output 90', at the computer 18. Such summary output 90 could comprise a finalized depiction of the graphic 22, illustrated as a graphic 22'. The graphic 22' visually reflects the arrangement of labels consistent with each parameter provided by the user during the build. In addition, the summary output 90 could include a part number 92, providing fields for referencing and/or immediately building the arrangement of labels, including the graphic 22, along with other manufacturing data. The part number 92 can allow the user to bypass steps 36-42 the next time, at decision step 34, as discussed above with respect to FIG. 2. The part number 92 can be an alphanumeric part number. Also, the summary output 90 could include a description field 94, which can include the background information 84 about the label, information about the adhesive, testing data and the like, as well as a pricing field 96 and/or a contact field 98 for placement of orders. The summary output 90 can also be provided by the server 12 to the industrial machine 26 to physically build the arrangement of labels specified by the user, consistent with the user's selections and/or inputs provided as the parameters 24, and as depicted by the graphic 22.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A system for building labels, the system comprising:
a processor executing a program stored in a non-transient medium to:
receive:
a part number corresponding to a numbered arrangement of labels to build; and
a selection of a customized arrangement of labels to build, the customized arrangement of labels being selected from a group consisting of rolls and sheets;
automatically produce a graphic for display to a screen, the graphic illustrating one of the numbered arrangement of labels and a default graphic corresponding to the selection of the customized arrangement of labels from the group;
receive a first parameter defining a characteristic of the labels of the customized arrangement of labels illustrated, the characteristic corresponding to a user-defined shape and dimension of each label of the customized arrangement of labels; and
replacing the default graphic with a custom generated graphic depicting the customized arrangement of labels wherein the user-defined shape and dimension of each label of the customized arrangement of labels are illustrated as being consistent with the first parameter received.

2. The system of claim 1, wherein the program stored in the non-transient medium is adapted to receive a selection of a printer having a predetermined configuration for the customized arrangement of labels, the predetermined configuration including a minimum or maximum dimension for the customized arrangement of labels.

3. The system of claim 1, wherein the program stored in the non-transient medium is adapted to receive a selection of a color for the labels of the customized arrangement of labels.

4. The system of claim 1, wherein the program stored in the non-transient medium is adapted to receive a selection of a type of material for the labels of the customized arrangement of labels.

5. The system of claim 1, further comprising the processor executing to communicate with an industrial machine for building the one of the numbered arrangement of labels and the customized arrangement of labels illustrating the arrangement of labels consistent with the first parameter.

6. A method for building labels, comprising:
selecting one of a numbered arrangement of labels and a customized arrangement of labels to build, the numbered arrangement of labels being selected by part number and the customized arrangement of labels being selected from a group consisting of rolls and sheets;
automatically producing a graphic for display to a screen, the graphic illustrating the selected one of the numbered arrangement of labels and a default graphic corresponding to the selection of the customized arrangement of labels from the group;
receiving a first parameter defining a characteristic of the customized arrangement of labels illustrated, the characteristic including a user-defined shape and dimension of each label of the customized arrangement of labels; and
replacing the default graphic with a custom generated graphic for display to the screen, the custom generated graphic illustrating the user-defined shape and dimension of each label of the customized arrangement of labels in accordance with the first parameter received.

7. The method of claim 6, comprising the additional step of receiving a selection of a printer having a predetermined configuration for the customized arrangement of labels to build, the predetermined configuration comprising a minimum or maximum dimension for the labels.

8. The method of claim 6, comprising the additional step of receiving a selection of a color with respect to the labels of the customized arrangement of labels.

9. The method of claim 6, comprising the additional step of receiving a selection of a type of material for the labels of the customized arrangement of labels.

10. The method of claim 6, further comprising the step of communicating with an industrial machine for building the one of the numbered arrangement of labels and the customized arrangement of labels including the characteristic of the labels thereof.

11. A system for building labels, comprising:
a computer executing a program stored in a non-transient medium to:
receive:
a part number corresponding to a numbered arrangement of labels to build; and
a selection of a customized arrangement of labels to build, the customized arrangement of labels being selected from a group consisting of rolls and sheets;
produce one of a graphic illustrating one of the numbered arrangement of labels and a default graphic corresponding to the selection of the customized arrangement of labels from the group;
display the one of the graphic and the default graphic to a screen of the computer;
receive a first parameter defining a characteristic of the labels of the customized arrangement of labels displayed, the characteristic corresponding to a user-defined shape and dimension of each label of the customized arrangement of labels; and
replace the default graphic with a custom generated graphic depicting the customized arrangement of labels and display the custom generated graphic to the screen, the custom generated graphic illustrating the user-defined shape and dimension of each label of the customized arrangement of labels in accordance with the first parameter received.

12. The system of claim 11, further comprising the computer executing to communicate with an industrial machine for building the one of the numbered arrangement of labels and the customized arrangement of labels including the characteristic of the labels thereof.

* * * * *